US011615025B2

(12) United States Patent
Musin et al.

(10) Patent No.: US 11,615,025 B2
(45) Date of Patent: Mar. 28, 2023

(54) ENCODING AND DECODING DEVICE FOR SYSTEM DATA OF STORAGE DEVICE

(71) Applicant: SK hynix Inc., Gyeonggi-do (KR)

(72) Inventors: Sergei Musin, Minsk (BY); Teodor Vlasov, Minsk (BY)

(73) Assignee: SK hynix Inc., Gyeonggi-do (KR)

( * ) Notice: Subject to any disclaimer, the term of this patent is extended or adjusted under 35 U.S.C. 154(b) by 209 days.

(21) Appl. No.: 16/786,571

(22) Filed: Feb. 10, 2020

(65) Prior Publication Data
US 2021/0248076 A1    Aug. 12, 2021

(51) Int. Cl.
*G06F 12/0831* (2016.01)
*G06F 12/02* (2006.01)
*G06F 9/30* (2018.01)
*G06F 7/58* (2006.01)

(52) U.S. Cl.
CPC .......... *G06F 12/0833* (2013.01); *G06F 7/588* (2013.01); *G06F 9/30029* (2013.01); *G06F 9/30032* (2013.01); *G06F 9/30196* (2013.01); *G06F 12/0246* (2013.01); *G06F 2212/7201* (2013.01); *G06F 2212/7209* (2013.01)

(58) Field of Classification Search
None
See application file for complete search history.

(56) References Cited

U.S. PATENT DOCUMENTS

| | | | | |
|---|---|---|---|---|
| 9,361,106 | B2* | 6/2016 | Wolrich | G06F 9/30007 |
| 2007/0019805 | A1 | 1/2007 | Karpovsky et al. | |
| 2010/0235709 | A1 | 9/2010 | Kowalski et al. | |
| 2016/0322990 | A1* | 11/2016 | Tuers | H03M 13/2909 |
| 2016/0328567 | A1* | 11/2016 | Chang | G06F 21/85 |
| 2017/0206030 | A1* | 7/2017 | Woo | G06F 3/062 |
| 2018/0183576 | A1* | 6/2018 | Wang | H04L 9/0631 |
| 2019/0179772 | A1* | 6/2019 | Ilani | G06F 12/1408 |
| 2019/0251889 | A1 | 8/2019 | Hoffman | |

OTHER PUBLICATIONS

Jeong, W. et al., improving Flash Storage Performance by Caching Address Mapping Table in Host Memory, 9th (USENIX) Workshop on Hot Topics in Storage and File Systems (HotStorage 17), Jul. 11, 2017, USENIX 2020, Santa Clara, CA.
Yang, S., Improving the Design of DRAM-Less PCIe SSD, 2017, Session 101-A: Consumer Applications, Flash Memory Summit 2017 Proceedings, Aug. 8, 2017, Santa Ciara, CA.

(Continued)

*Primary Examiner* — Stephanie Wu
(74) *Attorney, Agent, or Firm* — IP & T Group LLP

(57) ABSTRACT

An encoding device and a decoding device use linear and nonlinear codes for encoding and decoding system data for a storage device. The encoding device includes a linear encoder for encoding first data to generate encoded data and a nonlinear transformer for transforming the encoded data with second data to generate output data. The first data includes data on a physical address corresponding to a logical address. The second data includes the logical address and a timestamp value indicating a version of map data mapping between the logical address and the physical address.

7 Claims, 17 Drawing Sheets

(56) References Cited

OTHER PUBLICATIONS

Gupta, A. et al., DFTL: A Flash Translation Layer Employing Demand-based Selective Caching of Page-level Address Mappings, Mar. 2009, pp. 229-240, ASPLOS XIV: Proceedings of the 14th international conference on Architectural support for programming languages and operating systems, Washington, DC, USA.

Engelberg, S. et al., An Introduction to Robust Codes over Finite Fields, Nov. 7, 2013, pp. 751-763, vol. 55, No. 4, Society for Industrial and Applied Mathematics.

Karrpovsky, M.G. et al., Robust Error Detection in Communication and Computational Channels, 2007, Version 1, Proceedings of Int. Workshop on Spectral Techniques.

\* cited by examiner

ENCODING AND DECODING DEVICE FOR SYSTEM DATA OF STORAGE DEVICE

BACKGROUND

1. Field

Embodiments of the present disclosure relate to an encoding and decoding scheme for encoding and decoding system data of data storage devices.

2. Description of the Related Art

The computer environment paradigm has shifted to ubiquitous computing systems that can be used anytime and anywhere. As a result, the use of portable electronic devices such as mobile phones, digital cameras, and notebook computers has rapidly increased. These portable electronic devices generally use a memory system having memory device(s), that is, data storage device(s). The data storage device is used as a main memory device or an auxiliary memory device of the portable electronic devices.

Memory systems using memory devices provide excellent stability, durability, high information access speed, and low power consumption, since they have no moving parts. Examples of memory systems having such advantages include universal serial bus (USB) memory devices, memory cards having various interfaces such as a universal flash storage (UFS), and solid state drives (SSDs). Memory system(s), that is, data storage device(s) include devices for encoding and decoding various data including user data and system data therefor.

SUMMARY

Aspects of the present invention include an encoding device and a decoding device using linear and nonlinear codes for encoding and decoding system data for a storage device.

In one aspect, an encoding device includes: a linear encoder for encoding first data to generate encoded data; and a nonlinear transformer for transforming the encoded data with second data to generate output data. The first data includes data on a physical address corresponding to a logical address. The second data includes the logical address and a timestamp value indicating a version of map data mapping between the logical address and the physical address.

In another aspect, a decoding device includes: a nonlinear transformer for transforming first data with second data to generate transformed data; a linear decoder for decoding the transformed data to generate decoded data and syndrome; and a read processor for selectively reading third data corresponding to the second data based on a value of the syndrome and outputting one of the decoded data and the third data as output data. The first data includes data on a physical address corresponding to a logical address. The third data includes map data mapping between the logical address and the physical address. The second data includes the logical address and a timestamp value indicating a version of the map data.

Additional aspects of the present invention will become apparent from the following description.

DETAILED DESCRIPTION

Figure 1:
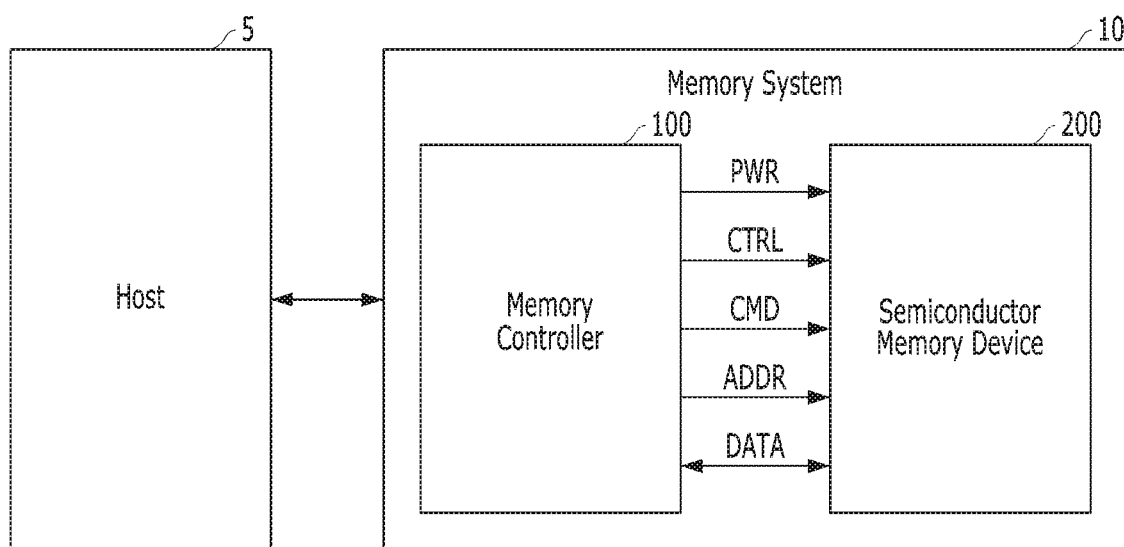
FIG. 1 is a block diagram illustrating a data processing system in accordance with an embodiment of the present invention.

Various embodiments are described below in more detail with reference to the accompanying drawings. The present invention may, however, be embodied in different forms and thus should not be construed as limited to the embodiments set forth herein. Rather, these embodiments are provided so that this disclosure is thorough and complete and fully conveys the scope of the present invention to those skilled in the art. Moreover, reference herein to "an embodiment," "another embodiment," or the like is not necessarily to only one embodiment, and different references to any such phrase are not necessarily to the same embodiment(s). Throughout the disclosure, like reference numerals refer to like parts in the figures and embodiments of the present invention.

The invention can be implemented in numerous ways, including as a process; an apparatus; a system; a computer program product embodied on a computer-readable storage medium; and/or a processor, such as a processor suitable for executing instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being suitable for performing a task may be implemented as a general component that is temporarily configured to perform the task at a given time or a specific component that is manufactured to perform the task. As used herein, the term 'processor' or the like refers to one or more devices, circuits, and/or processing cores suitable for processing data, such as computer program instructions.

A detailed description of embodiments of the invention is provided below along with accompanying figures that illustrate aspects of the invention. The invention is described in connection with such embodiments, but the invention is not limited to any embodiment. The scope of the invention is limited only by the claims. The invention encompasses numerous alternatives, modifications and equivalents within the scope of the claims. Numerous specific details are set forth in the following description in order to provide a thorough understanding of the invention. These details are provided for the purpose of example; the invention may be practiced according to the claims without some or all of these specific details. For clarity, technical material that is known in technical fields related to the invention has not been described in detail so that the invention is not unnecessarily obscured.

FIG. 1 is a block diagram illustrating a data processing system 2 in accordance with an embodiment of the present invention.

Referring FIG. 1, the data processing system 2 may include a host device 5 and a memory system 10. The memory system 10 may receive a request from the host device 5 and operate in response to the received request. For example, the memory system 10 may store data to be accessed by the host device 5.

The host device 5 may be implemented with any one of various kinds of electronic devices. In various embodiments, the host device 5 may include an electronic device such as a desktop computer, a workstation, a three-dimensional (3D) television, a smart television, a digital audio recorder, a digital audio player, a digital picture recorder, a digital picture player, and/or a digital video recorder and a digital video player. In various embodiments, the host device 5 may include a portable electronic device such as a mobile phone, a smart phone, an e-book, an MP3 player, a portable multimedia player (PMP), and/or a portable game player.

The memory system 10 may be implemented with any one of various kinds of storage devices such as a solid state drive (SSD) and a memory card. In various embodiments, the memory system 10 may be provided as one of various components in an electronic device such as a computer, an ultra-mobile personal computer (PC) (UMPC), a workstation, a net-book computer, a personal digital assistant (PDA), a portable computer, a web tablet PC, a wireless phone, a mobile phone, a smart phone, an e-book reader, a portable multimedia player (PMP), a portable game device, a navigation device, a black box, a digital camera, a digital multimedia broadcasting (DMB) player, a 3-dimensional television, a smart television, a digital audio recorder, a digital audio player, a digital picture recorder, a digital picture player, a digital video recorder, a digital video player, a storage device of a data center, a device capable of receiving and transmitting information in a wireless environment, a radio-frequency identification (RFID) device, as well as one of various electronic devices of a home network, one of various electronic devices of a computer network, one of electronic devices of a telematics network, or one of various components of a computing system.

The memory system 10 may include a memory controller 100 and a semiconductor memory device 200. The memory controller 100 may control overall operations of the semiconductor memory device 200.

The semiconductor memory device 200 may perform one or more erase, program, and read operations under the control of the memory controller 100. The semiconductor memory device 200 may receive a command CMD, an address ADDR and data DATA through input/output lines.

The semiconductor memory device 200 may receive power PWR through a power line and a control signal CTRL through a control line. The control signal CTRL may include a command latch enable signal, an address latch enable signal, a chip enable signal, a write enable signal, a read enable signal, as well as other operational signals depending on design and configuration of the memory system 10.

The memory controller 100 and the semiconductor memory device 200 may be integrated in a single semiconductor device such as a solid state drive (SSD). The SSD may include a storage device for storing data therein. When the semiconductor memory system 10 is used in an SSD, operation speed of a host device (e.g., host device 5 of FIG. 1) coupled to the memory system 10 may remarkably improve.

The memory controller 100 and the semiconductor memory device 200 may be integrated in a single semiconductor device such as a memory card. For example, the memory controller 100 and the semiconductor memory device 200 may be so integrated to configure a personal computer (PC) card of personal computer memory card international association (PCMCIA), a compact flash (CF) card, a smart media (SM) card, a memory stick, a multimedia card (MMC), a reduced-size multimedia card (RS-MMC), a micro-size version of MMC (MMCmicro), a secure digital (SD) card, a mini secure digital (miniSD) card, a micro secure digital (microSD) card, a secure digital high capacity (SDHC), and/or a universal flash storage (UFS).

Figure 2:
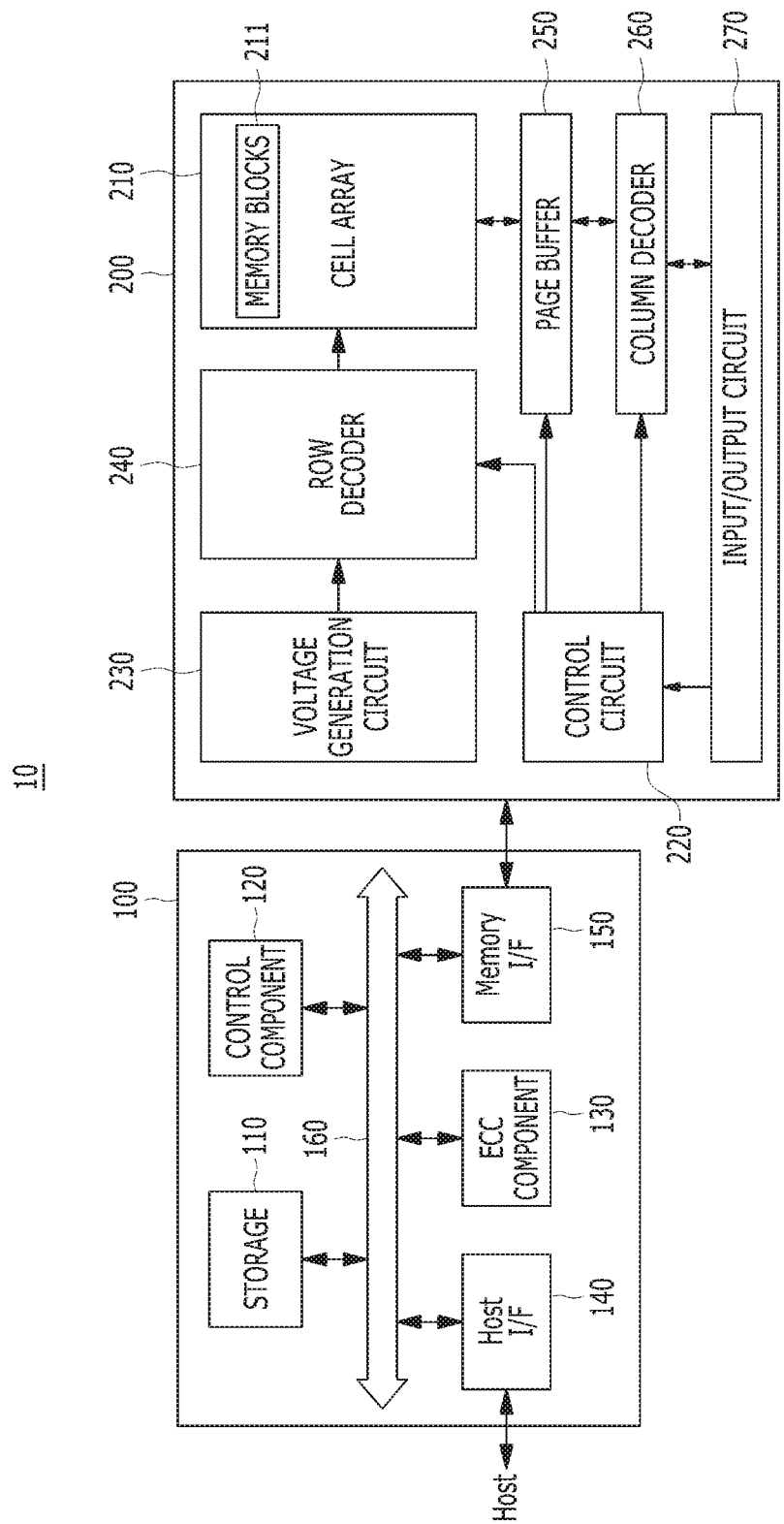
FIG. 2 is a block diagram illustrating a memory system in accordance with an embodiment of the present invention.

FIG. 2 is a block diagram illustrating a memory system in accordance with an embodiment of the present invention. For example, the memory system of FIG. 2 may depict the memory system 10 shown in FIG. 1.

Referring to FIG. 2, the memory system 10 may include a memory controller 100 and a semiconductor memory device 200. The memory system 10 may operate in response to a request from a host device (e.g., host device 5 of FIG. 1), and in particular, store data to be accessed by the host device.

The memory device 200 may store data to be accessed by the host device.

The memory device 200 may be implemented with a volatile memory device such as a dynamic random access memory (DRAM) and/or a static random access memory (SRAM) or a non-volatile memory device such as a read only memory (ROM), a mask ROM (MROM), a programmable ROM (PROM), an erasable programmable ROM (EPROM), an electrically erasable programmable ROM (EEPROM), a ferroelectric random access memory (FRAM), a phase change RAM (PRAM), a magnetoresistive RAM (MRAM), and/or a resistive RAM (RRAM).

The controller 100 may control storage of data in the memory device 200. For example, the controller 100 may control the memory device 200 in response to a request from the host device. The controller 100 may provide data read from the memory device 200 to the host device, and may store data provided from the host device into the memory device 200.

The controller 100 may include a storage 110, a control component 120, which may be implemented as a processor such as a central processing unit (CPU), an error correction code (ECC) component 130, a host interface (I/F) 140 and a memory interface (I/F) 150, which are coupled through a bus 160.

The storage 110 may serve as a working memory of the memory system 10 and the controller 100, and store data for driving the memory system 10 and the controller 100. When the controller 100 controls operations of the memory device 200, the storage 110 may store data used by the controller 100 and the memory device 200 for such operations as read, write, program and erase operations.

The storage 110 may be implemented with a volatile memory such as a static random access memory (SRAM) or a dynamic random access memory (DRAM). As described above, the storage 110 may store data used by the host device in the memory device 200 for the read and write operations. To store the data, the storage 110 may include a program memory, a data memory, a write buffer, a read buffer, a map buffer, and the like.

The control component 120 may control general operations of the memory system 10, and a write operation or a read operation for the memory device 200, in response to a write request or a read request from the host device. The control component 120 may drive firmware, which is referred to as a flash translation layer (FTL), to control general operations of the memory system 10. For example, the FTL may perform operations such as logical-to-physical (L2P) mapping, wear leveling, garbage collection, and/or bad block handling. The L2P mapping is known as logical block addressing (LBA).

The ECC component 130 may detect and correct errors in the data read from the memory device 200 during the read operation. The ECC component 130 may not correct error bits when the number of the error bits is greater than or equal to a threshold number of correctable error bits, and instead may output an error correction fail signal indicating failure in correcting the error bits.

In various embodiments, the ECC component 130 may perform an error correction operation based on a coded modulation such as a low density parity check (LDPC) code, a Bose-Chaudhu Hocquenghem (BCH) code, a turbo code, a turbo product code (TPC), a Reed-Solomon (RS) code, a convolution code, a recursive systematic code (RSC), a trellis-coded modulation (TCM), or a Block coded modulation (BCM). However, error correction is not limited to these techniques. As such, the ECC component 130 may include any and all circuits, systems or devices for suitable error correction operation.

The host interface 140 may communicate with the host device through one or more of various interface protocols such as a universal serial bus (USB), a multi-media card (MMC), a peripheral component interconnect express (PCI-e or PCIe), a small computer system interface (SCSI), a serial-attached SCSI (SAS), a serial advanced technology attachment (SATA), a parallel advanced technology attachment (PATA), an enhanced small disk interface (ESDI), and an integrated drive electronics (IDE).

The memory interface 150 may provide an interface between the controller 100 and the memory device 200 to allow the controller 100 to control the memory device 200 in response to a request from the host device. The memory interface 150 may generate control signals for the memory device 200 and process data under the control of the control component 120. When the memory device 200 is a flash memory such as a NAND flash memory, the memory interface 150 may generate control signals for the memory and process data under the control of the control component 120.

The memory device 200 may include a memory cell array 210, a control circuit 220, a voltage generation circuit 230, a row decoder 240, a page buffer 250, which may be in the form of an array of page buffers, a column decoder 260, and an input and output (input/output) circuit 270. The memory cell array 210 may include a plurality of memory blocks 211 which may store data. The voltage generation circuit 230, the row decoder 240, the page buffer array 250, the column decoder 260 and the input/output circuit 270 may form a peripheral circuit for the memory cell array 210. The peripheral circuit may perform a program, read, or erase operation of the memory cell array 210. The control circuit 220 may control the peripheral circuit.

The voltage generation circuit 230 may generate operation voltages of various levels. For example, in an erase operation, the voltage generation circuit 230 may generate operation voltages of various levels such as an erase voltage and a pass voltage.

The row decoder 240 may be in electrical communication with the voltage generation circuit 230, and the plurality of memory blocks 211. The row decoder 240 may select at least one memory block among the plurality of memory blocks 211 in response to a row address generated by the control circuit 220, and transmit operation voltages supplied from the voltage generation circuit 230 to the selected memory blocks.

Figure 3:
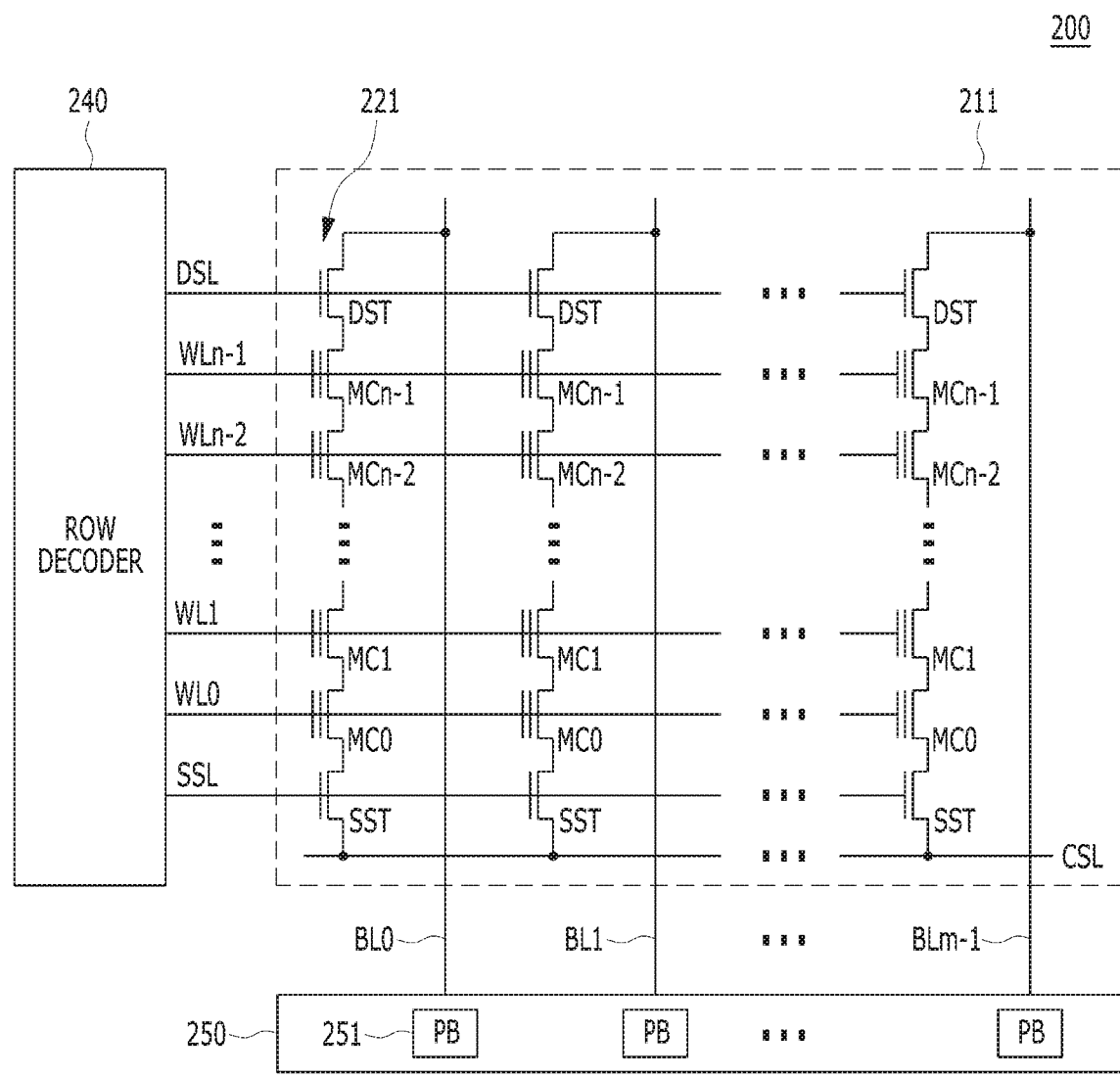
FIG. 3 is a circuit diagram illustrating a memory block of a memory device in accordance with an embodiment of the present invention.

The page buffer 250 may be coupled with the memory cell array 210 through bit lines BL (shown in FIG. 3). The page buffer 250 may precharge the bit lines BL with a positive voltage, transmit data to, and receive data from, a selected memory block in program and read operations, or temporarily store transmitted data, in response to page buffer control signal(s) generated by the control circuit 220.

The column decoder 260 may transmit data to, and receive data from, the page buffer 250 or transmit and receive data to and from the input/output circuit 270.

The input/output circuit 270 may transmit to the control circuit 220 a command and an address, received from an external device (e.g., the memory controller 100 of FIG. 1), transmit data from the external device to the column decoder 260, or output data from the column decoder 260 to the external device, through the input/output circuit 270.

The control circuit 220 may control the peripheral circuit in response to the command and the address.

FIG. 3 is a circuit diagram illustrating a memory block of a semiconductor memory device in accordance with an embodiment of the present invention. For example, the memory block of FIG. 3 may be any of the memory blocks 211 of the memory cell array 210 shown in FIG. 2.

Referring to FIG. 3, the exemplary memory block 211 may include a plurality of word lines WL0 to WLn−1, a drain select line DSL and a source select line SSL coupled to the row decoder 240. These lines may be arranged in parallel, with the plurality of word lines between the DSL and SSL.

The exemplary memory block 211 may further include a plurality of cell strings 221 respectively coupled to bit lines BL0 to BLm−1. The cell string of each column may include one or more drain selection transistors DST and one or more source selection transistors SST. In the illustrated embodiment, each cell string has one DST and one SST. In a cell string, a plurality of memory cells or memory cell transistors MC0 to MCn−1 may be serially coupled between the selection transistors DST and SST. Each of the memory cells may be formed as a multiple level cell. For example, each of the memory cells may be formed as a single level cell (SLC) storing 1 bit of data. Each of the memory cells may be formed as a multi-level cell (MLC) storing 2 bits of data. Each of the memory cells may be formed as a triple-level cell (TLC) storing 3 bits of data. Each of the memory cells may be formed as a quadruple-level cell (QLC) storing 4 bits of data.

The source of the SST in each cell string may be coupled to a common source line CSL, and the drain of each DST may be coupled to the corresponding bit line. Gates of the SSTs in the cell strings may be coupled to the SSL, and gates of the DSTs in the cell strings may be coupled to the DSL. Gates of the memory cells across the cell strings may be coupled to respective word lines. That is, the gates of memory cells MC0 are coupled to corresponding word line WL0, the gates of memory cells MC1 are coupled to corresponding word line WL1, etc. The group of memory cells coupled to a particular word line may be referred to as a physical page. Therefore, the number of physical pages in the memory block 211 may correspond to the number of word lines.

The page buffer array 250 may include a plurality of page buffers 251 that are coupled to the bit lines BL0 to BLm−1. The page buffers 251 may operate in response to page buffer control signals. For example, the page buffers 251 my temporarily store data received through the bit lines BL0 to BLm−1 or sense voltages or currents of the bit lines during a read or verify operation.

In some embodiments, the memory blocks 211 may include a NAND-type flash memory cell. However, the memory blocks 211 are not limited to such cell type, but may include NOR-type flash memory cell(s). Memory cell array 210 may be implemented as a hybrid flash memory in which two or more types of memory cells are combined, or one-NAND flash memory in which a controller is embedded inside a memory chip.

As described above, storage devices implemented with a NAND flash memory may use firmware (i.e., a flash translation layer (FTL)) to translate logical addresses associated with input and output (I/O) requests (e.g., read and write requests) to corresponding physical addresses of the flash memory. Further, the storage devices may manage a mapping table for storing system data (i.e., map data) mapping between logical addresses and physical addresses (i.e., L2P map data or entry). Storage devices such as mobile and low-cost SSDs typically have a memory (e.g., a random access memory (RAM)) with constrained size and hence they cannot keep the whole L2P mapping table in the memory. Therefore, mapping tables are partially retrieved from the NAND flash memory on demand, causing read performance degradation. To eliminate this degradation, a demand-based FTL may selectively cache L2P map data in an L2P cache of the memory 110 in the storage device 10 as shown in FIG. 4.

Figure 4:
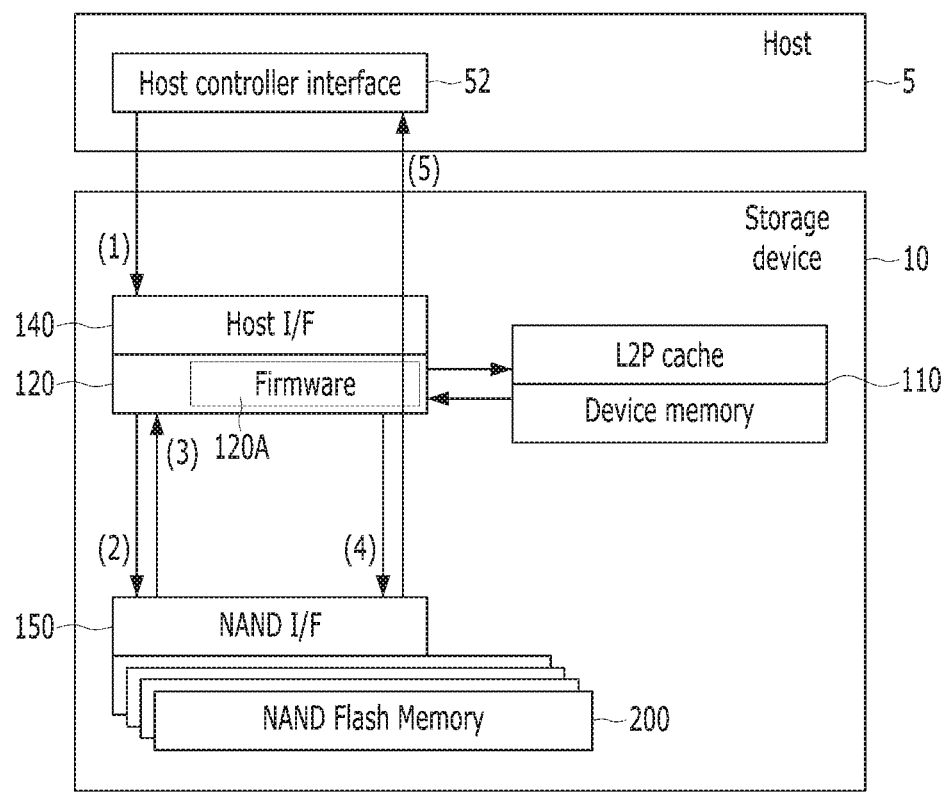
FIG. 4 is a diagram illustrating a read operation in a system including a storage device with system data.

Referring to FIG. 4, when a read command is received (1) from the host 5 through the host interface (I/F) 140, the control component 120 (i.e., firmware 120A) of the storage device 10 may send (2) a request for a corresponding L2P entry to the NAND flash memory 200 and read (3) the L2P entry from the NAND flash memory 200 through the NAND interface (I/F) 150. The control component 120 may store the L2P entry in the L2P cache. Thereafter, the control component 120 may request (4) user data corresponding to the read command to the NAND flash memory 200, read the user data from the NAND flash memory 200 and transfer (5) the user data to the host 5 through the host interface 140.

Figure 5:
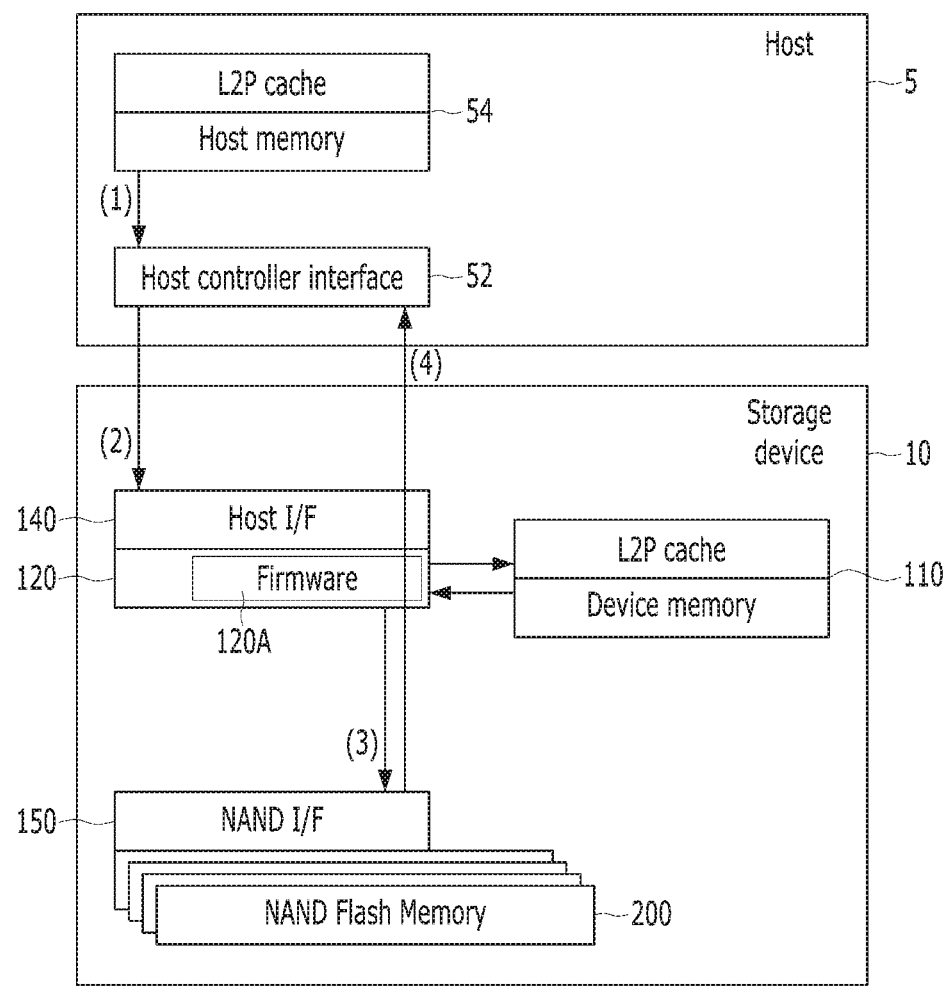
FIG. 5 is a diagram illustrating a read operation in a system including a host with system data and a storage device with system data.

As the size of each of the host 5 and the storage device 10 is reduced, there is a trend to allocate a memory of the host 5 (i.e., host memory) for the storage device 10. In a UFS mobile storage devices, a host-aware performance booster (HPB) is used. In an NVMe SSD, a host memory buffer (HMB) is used. Both features are intended to enable the storage device 10 to borrow the host memory for performance acceleration needs. For example, since the memory 110 (i.e., RAM) is limited, a host memory 54 may be used as a cache for the FTL mapping table as shown in FIG. 5. By using HPB or HMB, L2P map data may be read from the host memory 54 faster than from the NAND flash memory 200 or from the L2P cache of the memory 110.

Referring to FIG. 5, when the host 5 issues a read command, the host controller interface 52 may read (1) L2P data associated with the read command from the host memory 54. The control component 120 (i.e., firmware 120A) may fetch (2) the read command from the host 5 through the host interface 140. The control component 120 may send (3) a request for user data corresponding to the read command to the NAND flash memory 200, read the user data from the NAND flash memory 200 and transfer (5) the user data to the host 5 through the host interface 140. In a system as shown in FIG. 5, L2P map data (or L2P mapping table data) retrieved from the storage device 10 and stored in the host memory 54 may not be trustworthy. L2P map data (e.g., HPB entry) written to the host memory 54 may be recalled by the storage device 10 or sent from the host 5 to the storage device 10 later. In this case, the copy of L2P map data stored on the storage device 10 (i.e., L2P cache 110 or NAND flash memory 200) is more reliable than the same L2P map data stored on the host 5, when:

(1) Data in the NAND flash memory 200 is protected by powerful error correction code (ECC) (e.g., LDPC);

(2) L2P cache 110 is allocated in ECC-protected SRAM or DRAM with higher reliability than the host memory (e.g., DRAM) 54;

(3) A malicious attacker targets the host 5 rather than the storage device 10 with a targeted fault injection; and/or (4) Software memory corruption is more likely to happen on the host 5 than on the storage device 10.

For any of the above cases, it is sufficient to protect L2P map data by error detection code. No data correction is required because, in case of error, L2P map data can be recalled from the device-side L2P cache or L2P data stored in the NAND flash memory device. When an error is detected, L2P map data received from the host side is ignored and the slower to obtain, but more reliable data from the device-side L2P cache or the NAND flash memory device is used instead.

Unlike traditional error correcting codes, error detection codes (e.g., robust codes) for the systems described above ensure a certain error detection probability even if the host is taken over and controlled by an attacker. Existing robust code based solutions are limited to certain hardware implementations only. In real life, after hardware tape-out, customer requirements may change or debugging a particular issue may require re-balancing error detection capability and performance. In that case, component(s) for error detection (e.g., an encoder and a decoder) will need to be customized or even disabled and implemented in software.

Accordingly, it is desirable for the storage device 100 to provide an error detection scheme for system data (e.g., L2P map cache or L2P map data) of the storage device 10 that is stored on the host 5, thus ensuring that there is no data loss or data corruption. The error detection scheme may be used for HPB in a UFS mobile storage device as well as HMB in an NVMe SSD. In accordance with embodiments, an error detection scheme utilizes a more reliable, but more costly way to access a copy of the same data on the storage device 10, and also utilizes error detection codes efficiently implemented either in hardware or software to allow an adjustment to changing requirements, e.g., customer requirements.

Error detection scheme of embodiments uses a family of error detection codes that may be generally described as a composition of linear and nonlinear codes and also uses probabilistic adaptable control read of L2P data. The error detection scheme has the following characteristics:

(1) (Almost) uniform protection from errors from all attack points to prevent tampering (or fault-injection) attacks;

(2) The possibility of error detection without error correction for the cases when the latency of reading data from the NAND memory device is less than error correction latency;

(3) Both a hardware (HW) and a software (SW) (i.e., firmware (FW)) encoder and decoder are possible for a better customization to the requirements of specific customers at the time of customer deployment;

(4) Possibility to detect an error with control read (i.e., re-read of L2P data from the NAND memory device) even if it is not detected by the error correction code; and/or (5) Automatic increase of error protection under an increased frequency of errors, due to the increment in the probability of control read of L2P data.

Figure 6A:
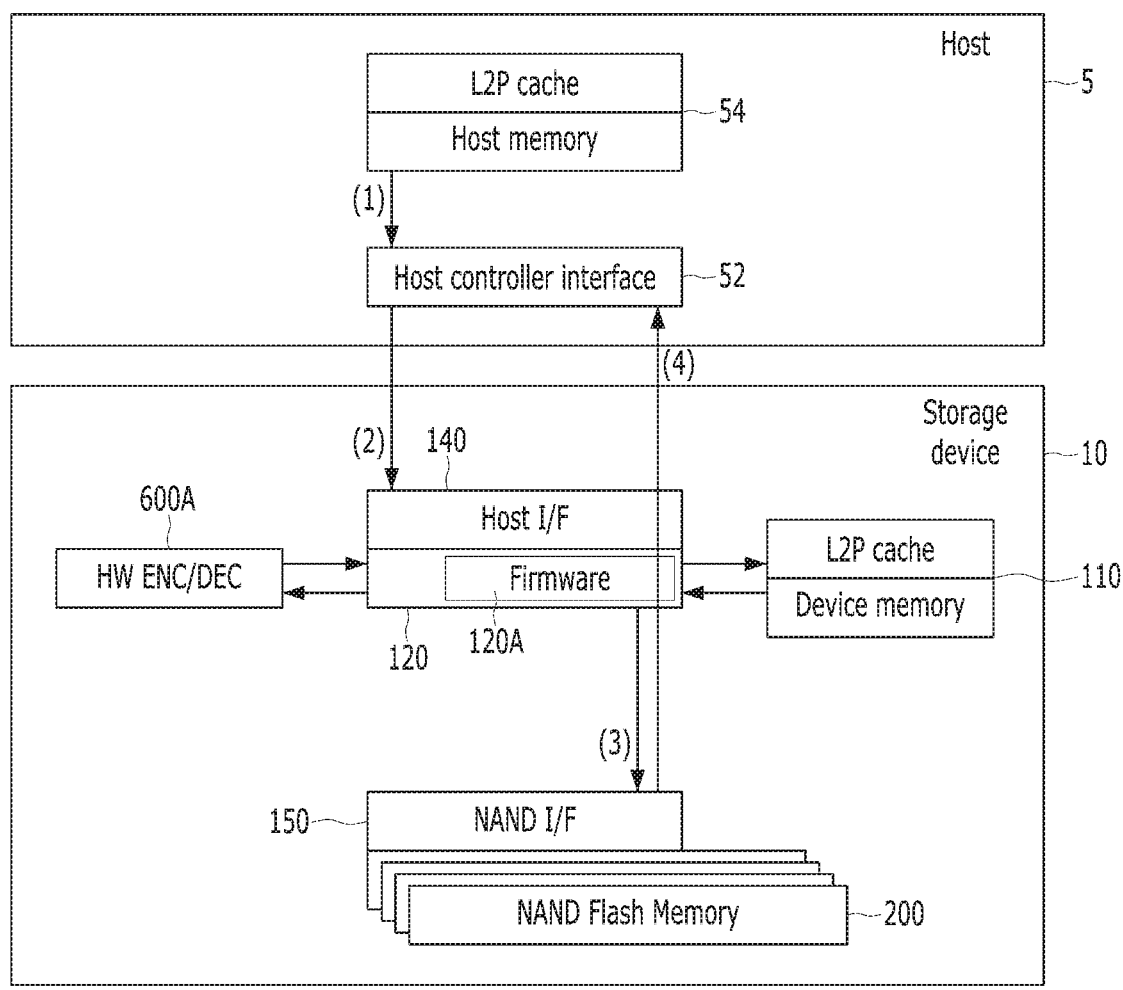
FIGS. 6A and 6B are diagrams illustrating a system including an encoder and a decoder in accordance with an embodiment of the present invention.
Figure 6B:
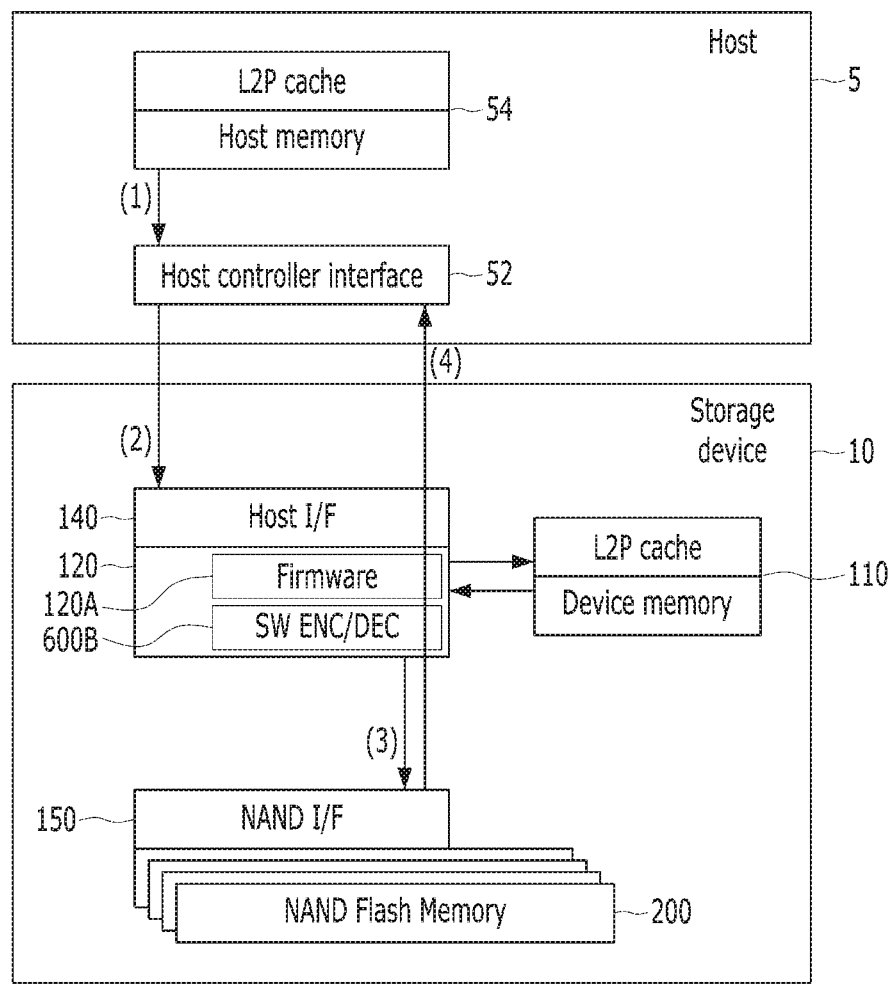

FIGS. 6A and 6B are diagrams illustrating a system including an encoder and a decoder in accordance with an embodiment of the present invention.

Referring to FIGS. 6A and 6B, the system may include a host 5 and a storage device (or a memory system) 10. The host 5 may include a host controller interface 52 and a host memory 54. The host memory 54 may include a host-side L2P cache for storing L2P data. The storage device 10 may include a memory device (e.g., a NAND flash memory) 200 and a controller. The controller may include a device memory 110, as well as a control component 120, a host interface (I/F) 140 and a NAND interface (I/F) 150 as shown in FIG. 2. The control component 120 may be implemented with a central processing unit (CPU). The device memory 110 may include a device-side L2P cache for storing L2P data.

When the host 5 issues a read command, the host controller interface 52 may read (1) L2P data associated with the read command from the host memory 54. The control component 120 (i.e., firmware 120A) may fetch (2) the read command from the host 5 through the host interface 140. The control component 120 may send (3) a request for user data corresponding to the read command to the NAND flash memory 200, read the user data from the NAND flash memory 200 and transfer (5) the user data to the host 5 through the host interface 140.

The controller may include a coder including an encoder and a decoder. The coder may be implemented in hardware (HW) or software (SW). In other words, the controller may include a hardware encoder and decoder 600A as shown in FIG. 6A or a software encoder and decoder 600B as shown in FIG. 6B. In deciding how the coder is to be implemented, i.e., in software or hardware, platform properties are taken into account. For a hardware implementation, codes that may be efficiently implemented in hardware are used; for a software implementation, codes that efficiently use a CPU instruction set are used.

In some embodiments, an encoder may encode first system data with second system data to generate L2P data. Conversely, a decoder may decode L2P data with the second system data to generate the first system data. For example, when the encoder and decoder are used for L2P data, the first system data may include a physical address and the second system data may include a logical address and a timestamp value. When L2P data is the HPB entry, the firmware 120A may manage an array with multiple cells. Each cell may correspond to the HPB segment and may be 1 byte wide. Each cell may include a timestamp. A timestamp represents a specific time for an HPB segment that is generated every time that HPB segment is updated. When a read request for HPB segment is acquired, a timestamp is looked up in the array by the segment identifier (ID), which is computed from a logical block address corresponding to the request.

Figure 7:
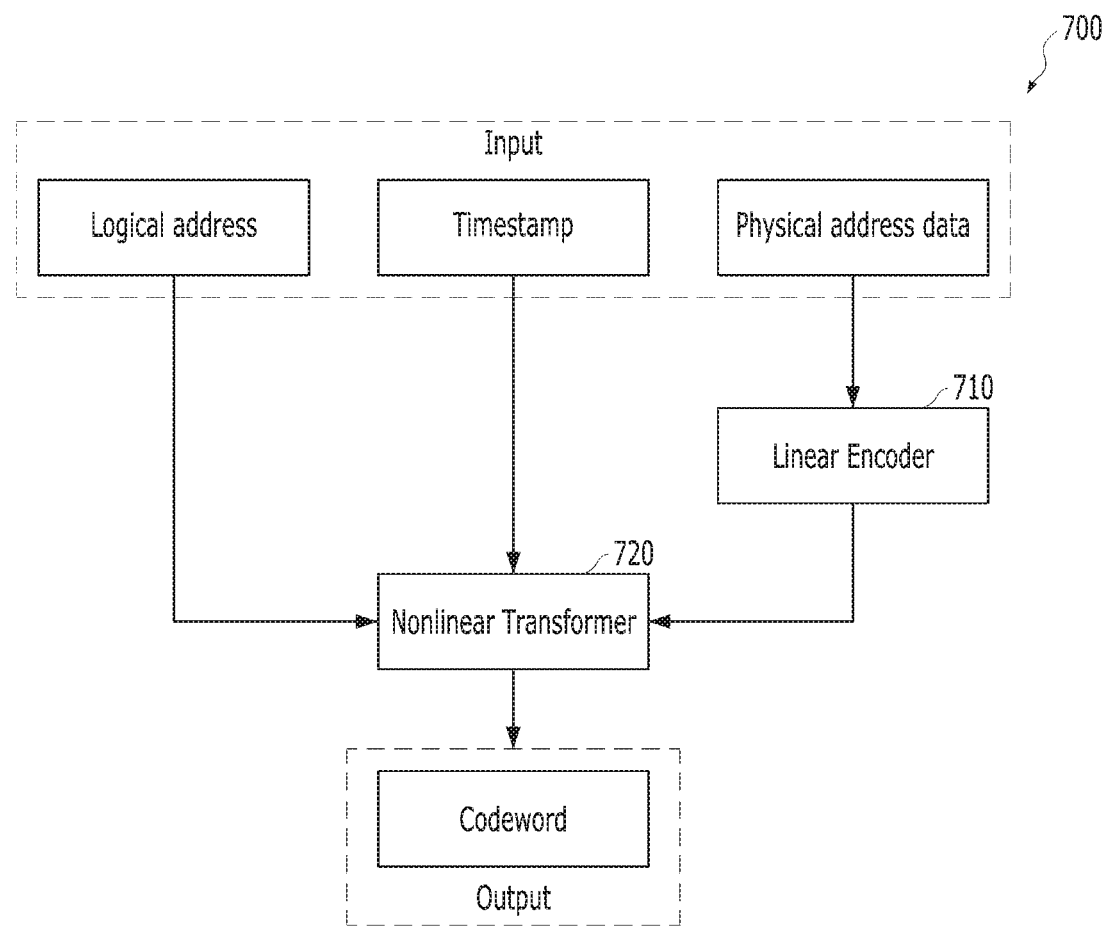
FIG. 7 is a diagram illustrating an encoding device in accordance with an embodiment of the present invention.

FIG. 7 is a diagram illustrating an encoding device 700 in accordance with an embodiment of the present invention.

Referring to FIG. 7, inputs of the encoding device 700 may include first data and second data. The second data may include a logical address and a timestamp value. The logical address may represent the address of data which the host 5 wants to read. The timestamp value may be used to track the version of L2P data on the host 5. The timestamp value is stored on the storage device 10. The first data may include data on a physical address (i.e., physical address data). The physical address data may represent a physical location of the NAND memory device 200 which corresponds to the logical address. The physical address data may include the physical location. Alternatively, the physical address data may include the physical location and a length starting from the physical location.

The encoding device 700 may include a linear encoder 710 and a nonlinear transformer 720. The linear encoder 710 implements a linear code encoding scheme that is chosen according to the requirements for error-detection capability and available space for check bits. Software and hardware implementations may require different types of code for the best performance. The nonlinear transformer 720 improves the robustness of linearly encoded codewords encoded by the linear encoder 710. The nonlinear transformer 720 is chosen in a way that would make distribution of errors over all multiplicities more uniform. At the same time, the nonlinear transform provides codewords that are as robust as possible: that is, the number of undetectable errors for all codewords are as few as possible.

The encoding device 700 may output a codeword as final output data. For example, the encoding device 700 may output the codeword to the host 5. The codeword may include information (i.e., physical address) about the physical location in which data is stored and is encrypted with its logical address and a timestamp value stored for the physical address on the storage device 10.

Figure 8:
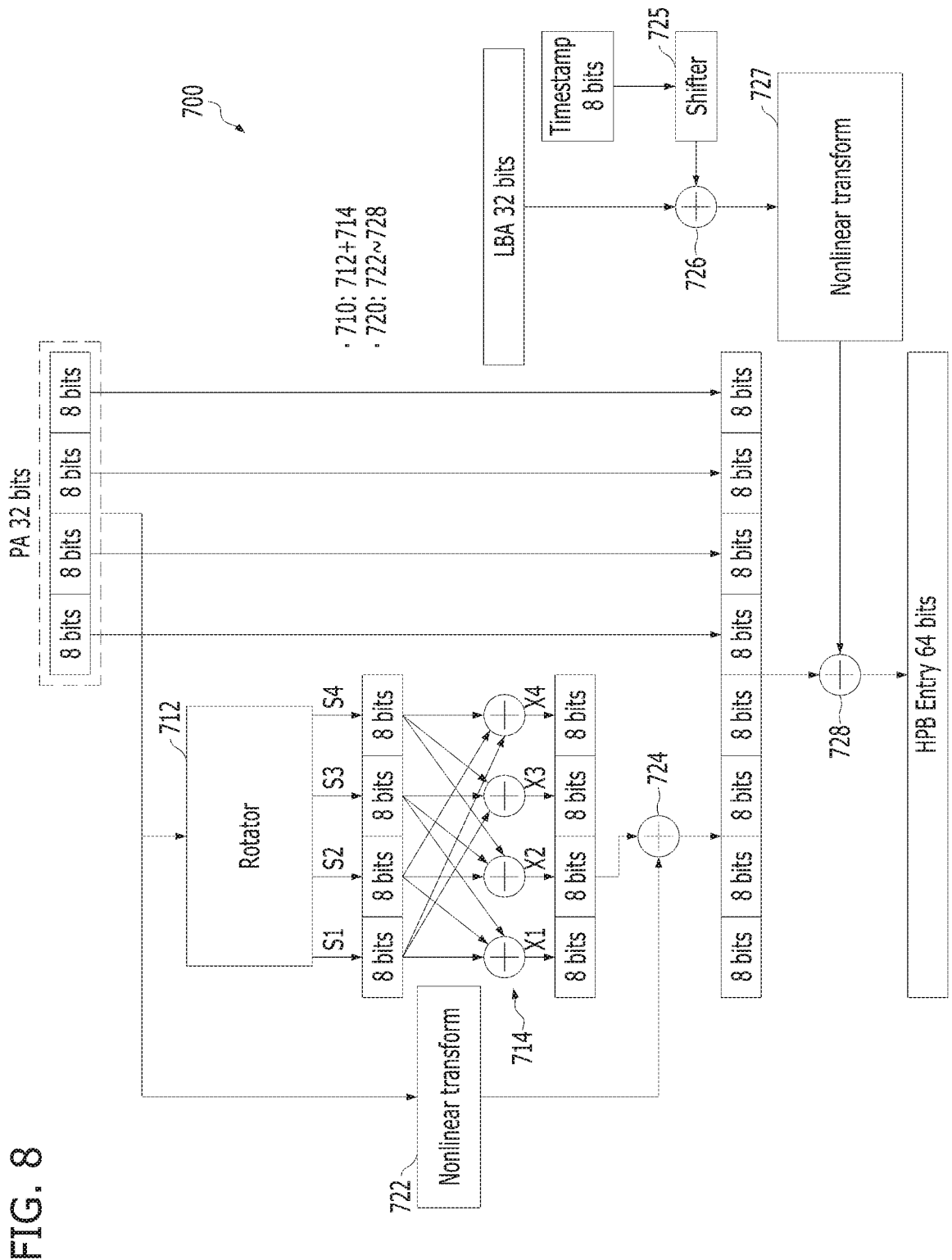
FIG. 8 illustrates a structure of an encoding device for HPB (Host Performance Booster) entry encoding as shown in FIG. 7.

FIG. 8 illustrates a structure of an encoding device 700 for L2P map data (e.g., HPB entry), as shown in FIG. 7.

Referring to FIG. 8, the encoding device 700 may encode first system data with second system data to generate L2P data. When the encoder is used for HPB entry, the first system data may include a physical address (PA) and the second system data may include a logical address or a logical block address (LBA) and a timestamp value. For example, the physical address may be 32 bits, the logical block address may be 32 bits and the timestamp value may be 8 bits. In this example, the encoding device 700 may generate an HPB entry with 64 bits.

The encoding device 700 may perform encoding based on linear encoding and nonlinear transformation using a shift and multiplication scheme. During encoding, two constants 0x93939393 and 0xB5B5B5B5 (where 0x represents a hexadecimal number) may be used. The constants may be chosen to be periodic to improve the encoding performance.

The encoding device 700 may include a linear encoder 710 and a nonlinear transformer 720. The linear encoder 710 may encode the first data (e.g., PA 32 bits) to generate encoded data (e.g., an HPB entry of 64 bits). The first data may include multiple segments, and each segment may include multiple bits. For example, the physical address includes 4 segments, and each segment includes 8 bits.

The linear encoder 710 may include a rotator 712 and a group of exclusive OR (XOR) operators 714. The rotator 712 may perform a bitwise rotation each segment of the first data to a set direction to generate rotated segments S1 to S4. For example, the rotator 712 rotates (or shifts) each segment to a right direction by a set number of bits (e.g., 4 bits), which may be implemented with a circular shifter.

Each XOR operator of the group of XOR operators 714 may perform an XOR operation on each rotated segment and remaining rotated segments to generate the encoded data. When the first data includes four segments S1 to S4 and each segment corresponds to 8 bits, the group of XOR operators 714 may include 4 XOR operators. Each XOR operator may perform the XOR operation on each rotated segment and two rotated segments sequentially following the corresponding rotated segment among the remaining rotated segments. For example, a first XOR operator X1 may perform the XOR operation on a first rotated segment S1 and two rotated segments S2 to S3 after the first rotated segment S1. A second XOR operator X2 may perform the XOR operation on a second rotated segment S2 and two rotated segments S3 to S4 sequentially following the second rotated segment S2. A third XOR operator X3 may perform the XOR operation on a third rotated segment S3 and two rotated segments S4 to S1 sequentially following the third rotated segment S3. A fourth XOR operator X4 may perform the XOR operation on a fourth rotated segment S4 and two rotated segments S1 to S2 sequentially following the fourth rotated segment S4. In other words, each XOR operator performs the XOR operation on the corresponding rotated segment (i.e., rotated right 0 bits) and two rotated segments (i.e., rotated right 8 and 16 bits).

The nonlinear transformer 720 may transform the encoded data with the second data to generate output data. For example, the second data includes the logical address (e.g., LBA 32 bits) and a timestamp value (e.g., 8 bits) indicating a version of map data mapping between the logical address and the physical address.

The nonlinear transformer 720 may include a first nonlinear transform component 722, a first XOR operator 724, a shifter 725, a second XOR operator 726, a second nonlinear transform component 722 and a third XOR operator 728. The first nonlinear transform component 722 may generate a first multiplication value corresponding to the first data (e.g., PA 32 bits) multiplied by a set value (e.g., 0x93939393). The first XOR operator 724 may perform an XOR operation on the encoded data and the first multiplication value to generate a first operation value.

When the number of bits of the logical address (e.g., LBA 32 bits) is greater than the number of bits of the timestamp value (e.g., 8 bits), the shifter 725 may shift the timestamp value to generate a sequence. The shifter 725 may generate the sequence by shifting the timestamp value to a left direction by a set number of bits corresponding to the difference between the logical address and the timestamp value. For example, when the logical address has 32 bits and the timestamp value has 8 bits, the sequence is generated by shifting (or extending) the timestamp value to a left direction by 24 bits.

The second XOR operator 726 may perform an XOR operation on the logical address and the sequence to generate the 15 second operation value. In other words, the second XOR operator 726 may perform a shift and XOR (i.e., xorshift) operation on the logical address and the timestamp value. The second nonlinear transform component 727 may generate a second multiplication value corresponding to the second operation value multiplied by a set value (e.g., 0xB5B5B5B5). The second nonlinear transform component 727 is used to improve the randomization properties of the xorshift operation.

The third XOR operator 728 may perform an XOR operation on a sequence including the first operation value and the first data, and the second multiplication value to generate a third operation value as the codeword (or final encoded data) (i.e., HPB entry 64 bits).

Figure 9A:
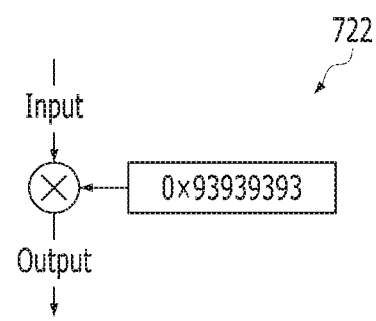
FIGS. 9A and 9B illustrate implementations of a nonlinear transform component in FIG. 8.
Figure 9B:
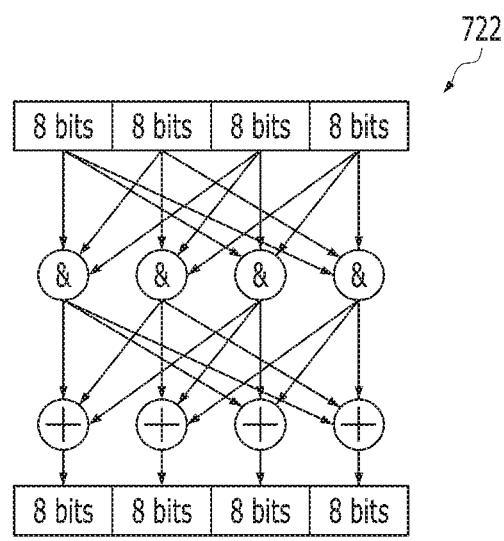

FIGS. 9A and 9B illustrate implementations of the first nonlinear transform component 722 in FIG. 8.

In FIG. 9A, for a software implementation of the first nonlinear transform component 722, the constant value 0x93939393 is used for multiplication with a physical address. In FIG. 9B, for a hardware implementation of the first nonlinear transform component 722, any other nonlinearity that may be efficiently implemented in hardware may be used, such as well-known quadratic or cubic codes over finite field (e.g., FIG. 9B), etc. The implementations of FIGS. 9A and 9B may be applied to the second nonlinear transform component 727 in FIG. 8. For the second nonlinear transform component 727, the constant value 0xB5B5B5B5 is used for multiplication with the number generated from a logical address and a timestamp value.

Figure 10:
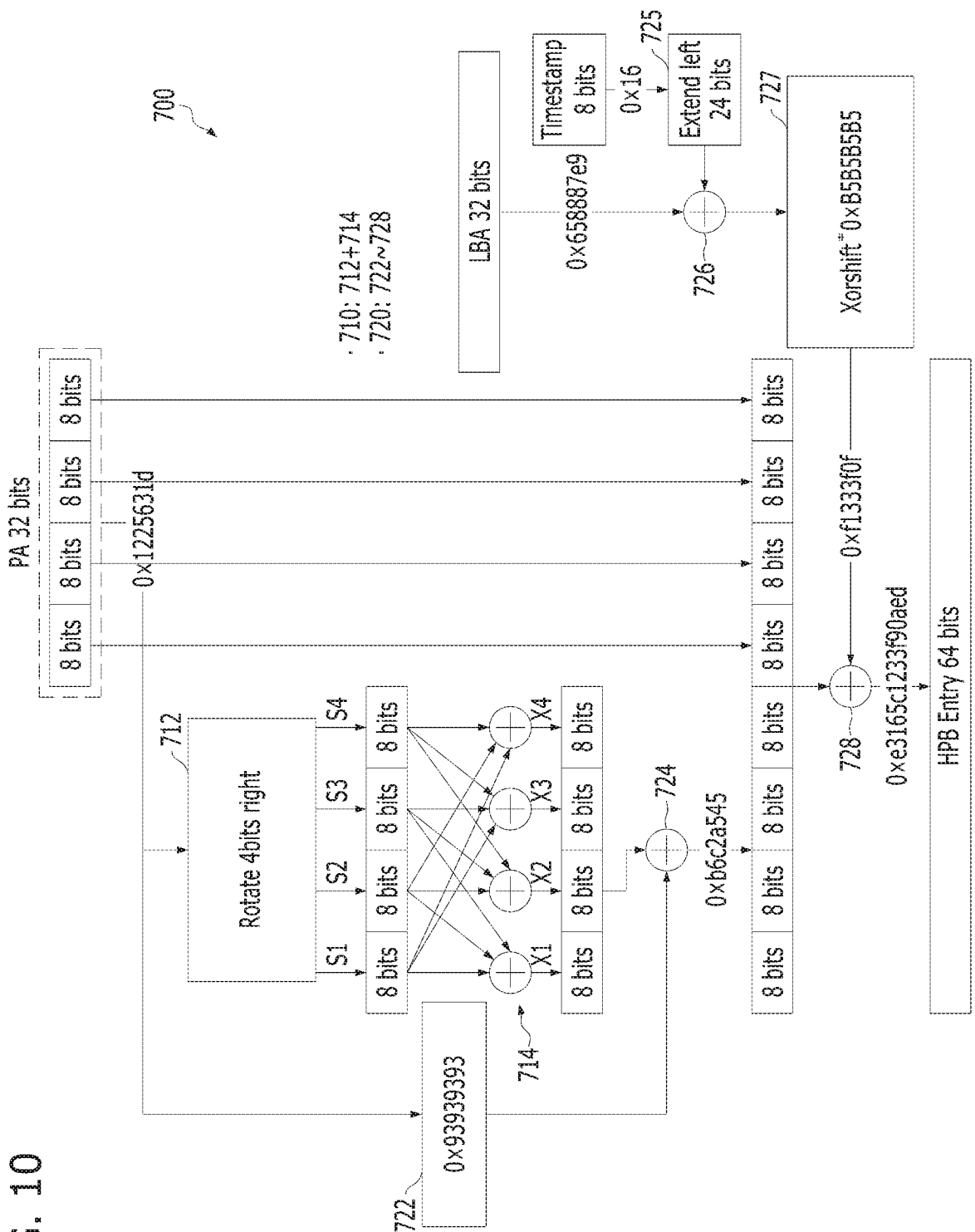
FIG. 10 illustrates an example of an encoding device for HPB entry encoding, as shown in FIG. 8.

FIG. 10 illustrates an example of the encoding device 700 for HPB entry encoding, as shown in FIG. 8.

In FIG. 10, it is assumed that PA=0x1225631d, LBA=0x658887e9 and Timestamp=0x16. The output of the first nonlinear transform component 722, i.e., the result of rotation and xoring is 0xb6c2a545. The output of the second nonlinear transform component 727, i.e., the xorshift result of LBA and Timestamp multiplied by the constant 0xB5B5B5B5 is 0xf1333f0f. The final codeword (i.e., HPB entry) 0xe3165c1233f90aed is acquired after xoring with PA multiplied by the constant 0x93939393 and the result of xorshift multiplied by the constant 0xB5B5B5B5.

Figure 11:
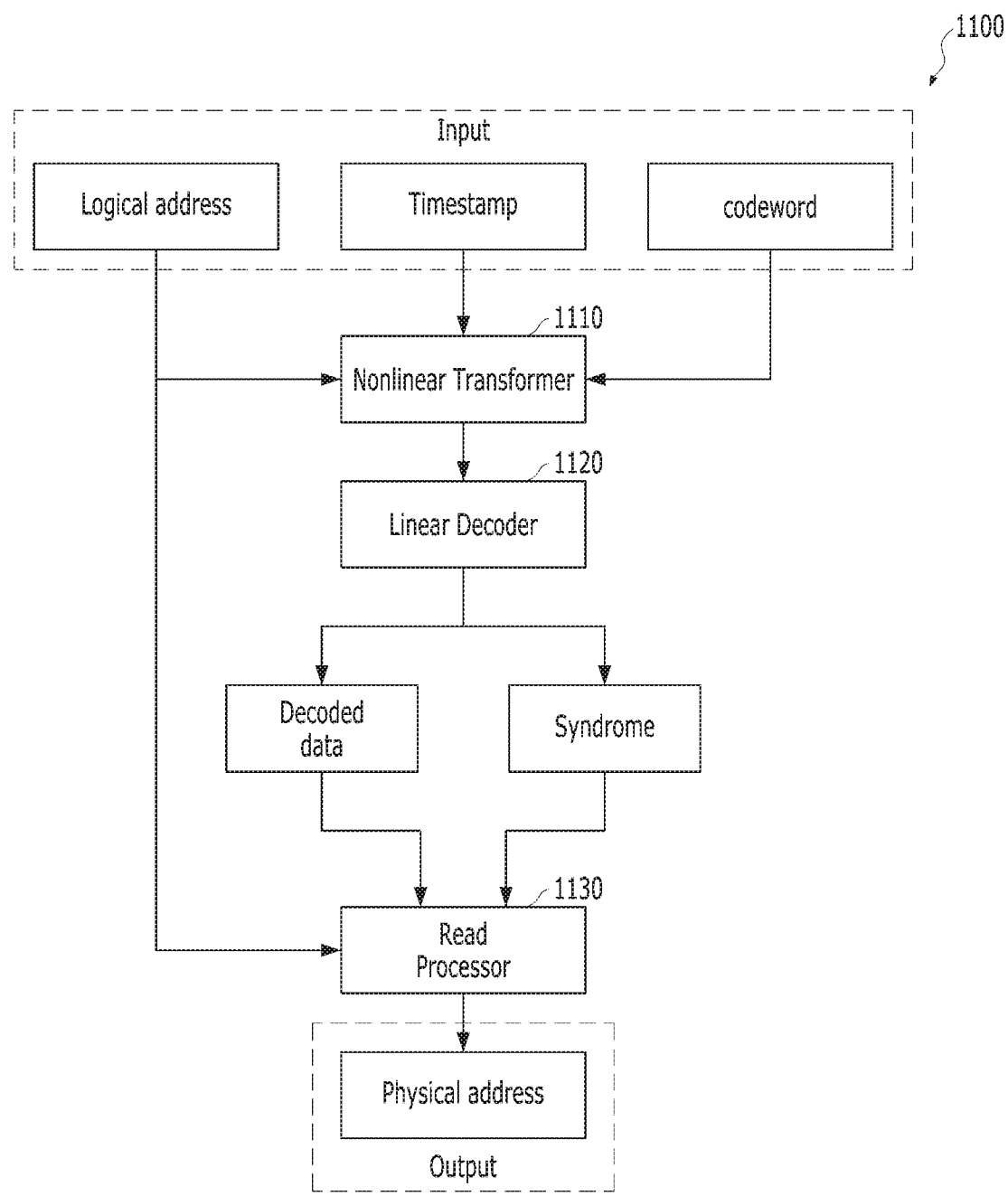
FIG. 11 is a diagram illustrating a decoding device in accordance with an embodiment of the present invention.

FIG. 11 is a diagram illustrating a decoding device 1100 in accordance with an embodiment of the present invention.

Referring to FIG. 11, inputs of the decoding device 1100 may include first data and second data. The second data may include a logical address and a timestamp value. The logical address may represent the address of data which the host 5 wants to read. The timestamp value may be used to track (or verify) the version of L2P data on the host 5. The timestamp value is stored on the storage device 10. The first data may include a codeword, which includes data about a physical location (i.e., physical address data) and is encrypted with the logical address and the time stamp value. The physical address data may represent a physical location of the NAND memory device 200 which corresponds to the logical address. The physical address data may include the physical location. Alternatively, the physical address data may include the physical location and a length starting from the physical location. For example, the first data may be received from the host 5.

The decoding device 1100 may include a nonlinear transformer 1110, a linear decoder 1120 and a read processor 1130. The nonlinear transformer 1110 may transform the first data with the second data to generate the transformed data. In other words, the nonlinear transformer 1110 may decrypt the codeword with the logical address and the corresponding timestamp value.

The linear decoder 1120 may decode the transformed data to generate decoded data and syndrome. In other words, the linear decoder 1120 may perform decoding of the linearly coded codeword and provide the decoded data for the physical address and the syndrome as the decoding result, which indicates whether errors were detected. The read processor 1130 may selectively read third data corresponding to the second data based on a value of the syndrome and output the decoded data or the third data as output data. The output data may be the physical address data.

Figure 12:
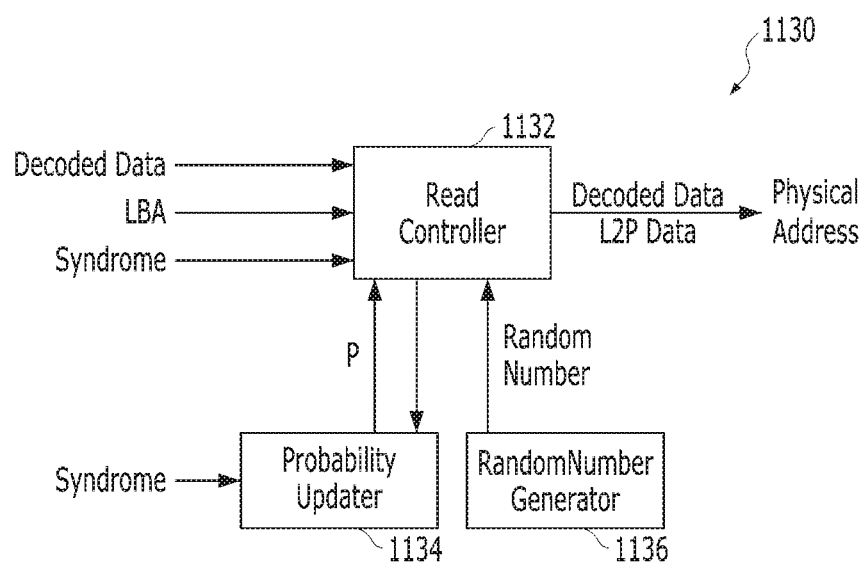
FIG. 12 is a diagram illustrating a read processor in FIG. 11.

FIG. 12 is a diagram illustrating the read processor 1130 in FIG. 11.

Referring to FIG. 12, the read processor 1130 may include a read controller 1132, a probability updater 1134 and a random number 1136. The read controller 1132 may determine the value of the syndrome and a probability based on the value of the syndrome. The syndrome may indicate whether errors on decoded data were detected and may be used to update the probability of performing a control read of L2P data. The read controller 1132 may receive the probability (P) from the probability updater 1134 and a random number generated by the random number generator 1136, and compare the probability with the random number. The random number generator 1136 may generate uniformly distributed random numbers which are used to decide whether control read of L2P data is to be generated by the read controller 1132.

The read controller 1132 may determine whether to read the physical address corresponding to the logical address (i.e., L2P data) based on the comparison result. When the probability is greater than the random number (i.e., the random number is less than the probability), the read controller 1132 may read the L2P data from the device L2P cache 110 or the NAND flash memory 200 of FIGS. 6A and 6B to output the physical address as the output data. When the probability is less than or equal to the random number (i.e., the random number is greater than or equal to the probability), the read controller 1132 may output the decoded data (i.e., the physical address) as the output data.

Further, the read controller 1132 may unconditionally read L2P data and output the physical address corresponding to the logical address when the value of the syndrome is not zero (i.e., the value of the syndrome indicates that the decoded data is not valid). The read controller 1132 may output the decoded data (i.e., the physical address) when the value of the syndrome indicates that the decoded data is valid.

The probability updater 1134 may update the probability based on a determination made by the read controller 1132 as to whether the decoded data is valid, which determination is made based on the value of the syndrome. When the value of the syndrome indicates that the decoded data is not valid, the probability updater 1134 increases the probability. When the value of the syndrome indicates that the decoded data is valid, the probability updater 1134 decreases the probability. In other words, the probability of control read of L2P data is incremented when invalid data (i.e., PA) was received from the host 5, while is decremented when valid data was received from the host 5. Further, when the control read of L2P data was performed, the read controller 1132 may compare the decoded data with the read L2P data. When the read L2P data does not match the decoded data, the read controller 1132 may control the probability updater 1134 to increase the probability of the L2P data.

As described above, the read controller 1132 may output the decoded data or L2P data as the output data (i.e., the physical address).

Figure 13A:
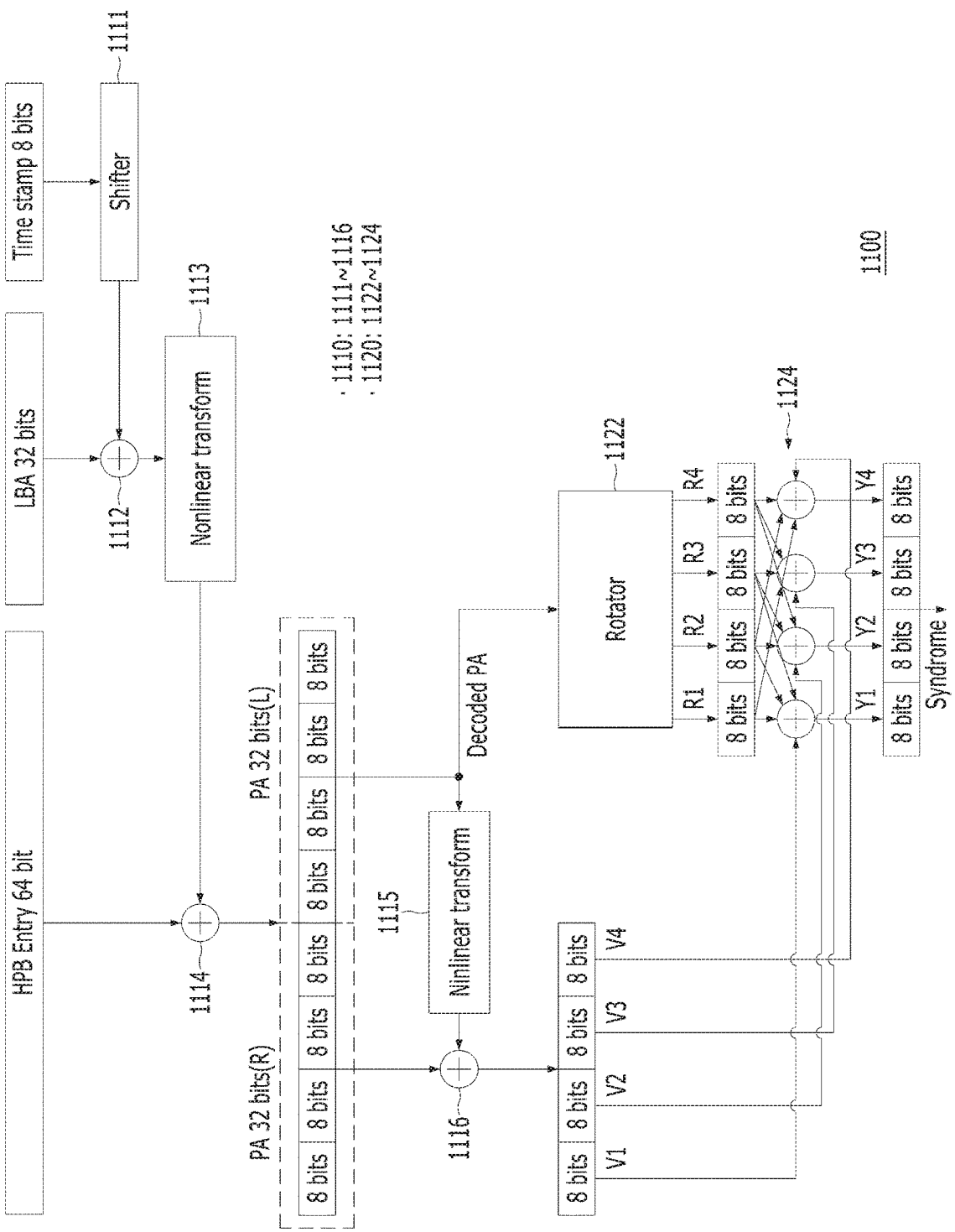
FIGS. 13A and 13B illustrate a structure of a decoding device for HPB entry decoding, as shown in FIGS. 11 and 12.
Figure 13B:
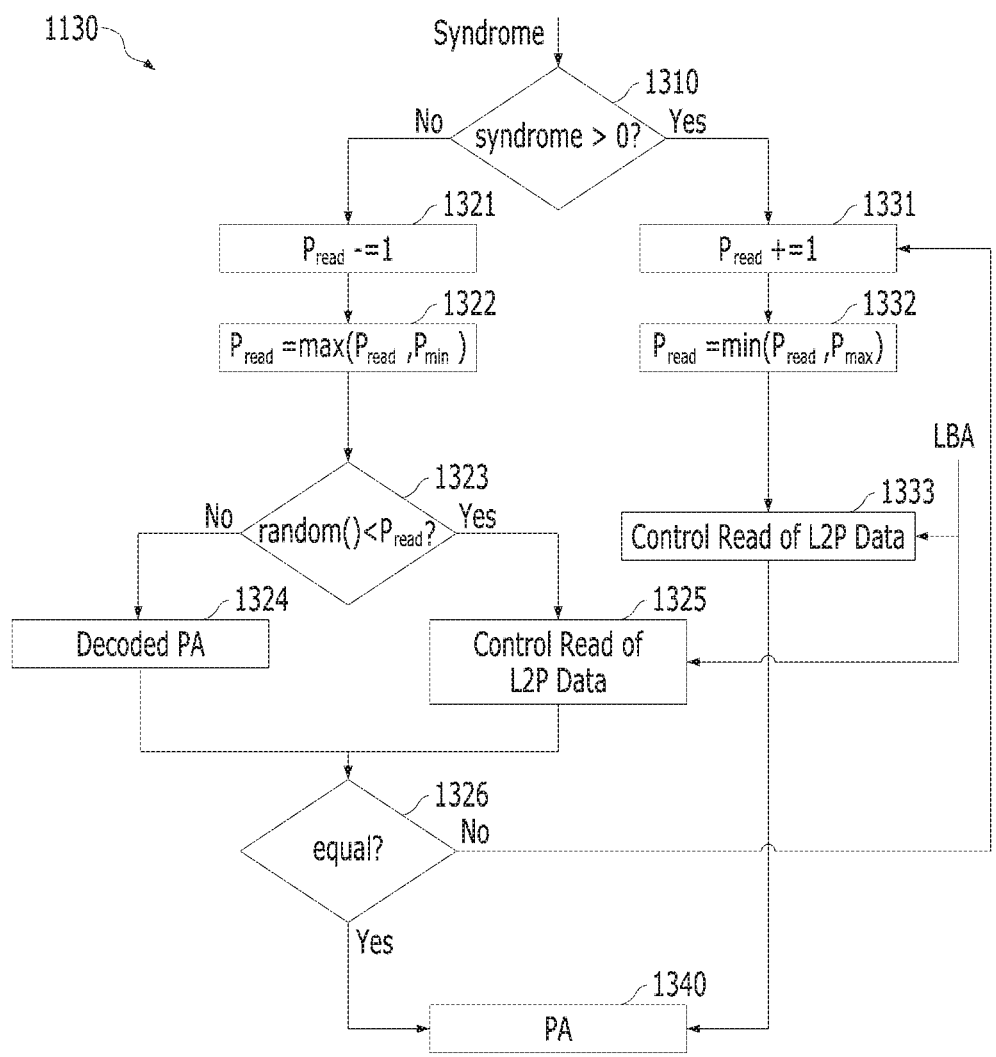

FIGS. 13A and 13B illustrate a structure of a decoding device 1100 for HPB entry decoding, as shown in FIGS. 11 and 12.

Referring to FIGS. 13A and 13B, the decoding device 1100 may decode first data (i.e., encoded system data) with second data to generate decoded data. When the decoding device 1100 is used for the HPB entry, the first data may include the HPB entry, the second data may include a logical address or a logical block address (LBA) and a timestamp value, and the decoded data may include a physical address (PA). For example, the HPB entry may be 64 bits, the logical block address may be 32 bits and the timestamp value may be 8 bits. In this example, the decoding device 1100 may generate the physical address with 32 bits.

The decoding device 1100 may perform decoding based on linear decoding and nonlinear transformation using a shift and multiplication scheme. During decoding, two constants 0x93939393 and 0xB5B5B5B5 (where 0x represents a hexadecimal number) may be used. The constants may be chosen to be periodic to improve the decoding performance.

The decoding device 1100 may include a nonlinear transformer 1110, a linear decoder 1120 and a read processor 1130. The nonlinear transformer 1110 may transform the first data with the second data to generate transformed data. The linear decoder 1120 may decode the transformed data to generate decoded data and syndrome. The read processor 1130 may selectively read third data (i.e., L2P data) corresponding to the second data (i.e., LBA) based on a value of the syndrome and output one of the decoded data and the third data as output data (i.e., PA).

Referring to FIG. 13A, the nonlinear transformer 1110 may include a shifter 1111, a first exclusive OR (XOR) operator 1112, a first nonlinear transform component 1113, a second XOR operator 1114, a second nonlinear transform component 1115, and a third XOR operator 1116. The linear decoder 1120 may include a rotator 1122 and a group of XOR operators 1124.

Since the number of bits of the logical address (e.g., 32 bits) is greater than the number of bits of the timestamp value (e.g., 8 bits), the shifter 1111 may shift the timestamp value by the difference between the number of bits of the logical address and the number of bits of the timestamp value to generate a shifted timestamp value. The shifter 1111 may generate the sequence by shifting the timestamp value to a left direction by a set number of bits corresponding to the difference between the logical address and the timestamp value. For example, when the logical address has 32 bits and the timestamp value has 8 bits, the sequence is generated by shifting (or extending) the timestamp value to a left direction by 24 bits.

The first XOR operator (or gate) 1112 may perform an XOR operation on the logical address and the shifted timestamp value to generate a first operation value. In other words, the first XOR operator 1112 may perform a shift and XOR (i.e., xorshift) operation on the logical address and the timestamp value. The first nonlinear transform component 1113 may multiply the first operation value by a first set value (e.g., 0xB5B5B5B5) to generate the first multiplication value.

The second XOR operator 1114 may perform an XOR operation on the first data (i.e., HPB entry) and the first multiplication value from the first nonlinear transform component 1113 to generate a second operation value as the transformed data. The transformed data may include multiple segments, a first subset of which constitutes a first part and a second subset of which constitutes a second part. In FIG. 13A, the first part is the rightmost four 8 bit segments (i.e., PA 32 bits (R)) and the second part is the leftmost four 8 bits segments (i.e., PA 32 bits (L)). In some embodiments, the second part of the transformed data may be decoded data.

The second nonlinear transform component 1115 may multiply the second part of the transformed data (i.e., the second operation value) by a second set value (e.g., 0x93939393) to generate a second multiplication value. The third XOR operator 1116 may perform an XOR operation on the first part of the second operation value and the second multiplication value to generate a third operation value. In some embodiments, the third operation value includes 4 segments V1 to V4.

The rotator 1122 may perform a bitwise rotation each segment of the second part to a set direction to generate rotated segments R1 to R4. For example, the rotator 1122 rotates each segment to a right direction by a set number of bits (e.g., 4 bits), which may be implemented with a circular shifter.

Each XOR operator of the group of XOR operators 1124 may perform an XOR operation on a corresponding rotated segment, e.g., R1, other rotated segments, e.g., R2 and R3, and a corresponding segment of the third operation value, e.g., V1, to generate the syndrome. When the input segments include four segments R1 to R4 and each segment corresponds to 8 bits, the group of XOR operators 1124 may include 4 XOR operators. Each XOR operator may perform the XOR operation on each rotated segment, two rotated segments sequentially following the corresponding rotated segment, and a corresponding segment of the third operation value. For example, a first XOR operator W1 may perform the XOR operation on a first rotated segment R1, two rotated segments R2 to R3 after the first rotated segment R1 and a first segment V1 of the third operation value. A second XOR operator W2 may perform the XOR operation on a second rotated segment R2, two rotated segments R3 to R4 after the second rotated segment R2 and a second segment V2 of the third operation value. A third XOR operator W3 may perform the XOR operation on a third rotated segment R3, two rotated segments R4 to R1 after the third rotated segment R3 and a third segment V3 of the third operation value. A fourth XOR operator W4 may perform the XOR operation on a fourth rotated segment R4, two rotated segments R1 to R2 after the fourth rotated segment R4 and a fourth segment V4 of the third operation value. In other words, each XOR operator performs the XOR operation on the corresponding rotated segment (i.e., rotated right 0 bits), two rotated segments (i.e., rotated right 8 and 16 bits) and the corresponding segment of the third operation value.

Referring to FIG. 13B, the read processor 1130 may determine the value of the syndrome and a probability based on the value of the syndrome. The read processor 1130 may update the probability based on determining whether or not the value of the syndrome indicates that the decoded data is valid (i.e., whether or not the value of the syndrome is zero) (1310).

The read processor 1130 may decrease the probability ($P_{read}$) when the value of the syndrome indicates that the decoded data is valid (1310, No). The read processor 1130 may increase (1331) the probability ($P_{read}$) when the value of the syndrome indicates that the decoded data is not valid, i.e., the value of the syndrome is greater than zero (1310, Yes). Further, the read processor 1130 may determine, as the probability ($P_{read}$), the minimum value of the increased probability ($P_{read}$) and the maximum probability ($P_{max}$) (1332). Next, the read processor 1130 may read L2P data corresponding to the logical address, and output, as output data (i.e., PA), the physical address corresponding to the logical address (1333).

The read processor 1130 may decrease the probability ($P_{read}$) when the value of the syndrome indicates that the decoded data is valid, i.e., the value of the syndrome is not greater than zero (1321). Further, the read processor 1130 may determine, as the probability ($P_{read}$), the maximum value of the deceased probability ($P_{read}$) and the minimum probability ($P_{min}$) (1332). Next, the read processor 1130 may compare the probability ($P_{read}$) with a random number "random( )" (1323).

When the probability ($P_{read}$) is greater than the random number (1323, Yes), the read processor 1130 may read L2P data corresponding to the logical address (1325). When the probability ($P_{read}$) is less than or equal to the random number (1323, No), the read processor 1130 may determine the decoded data as the output data (1324). Next, the read processor 1130 may compare the decoded data with the read physical address of the L2P data (1326).

When the decoded data does not match (or is not equal to) the read physical address (1326, No), the read processor 1130 may increase the probability ($P_{read}$) (1331). When the decoded data matches (or is equal to) the read physical address (1326, Yes), the read processor 1130 may output the decoded data or the read physical address that matches the decoded data as the output data (i.e., PA) (1340).

Figure 14A:
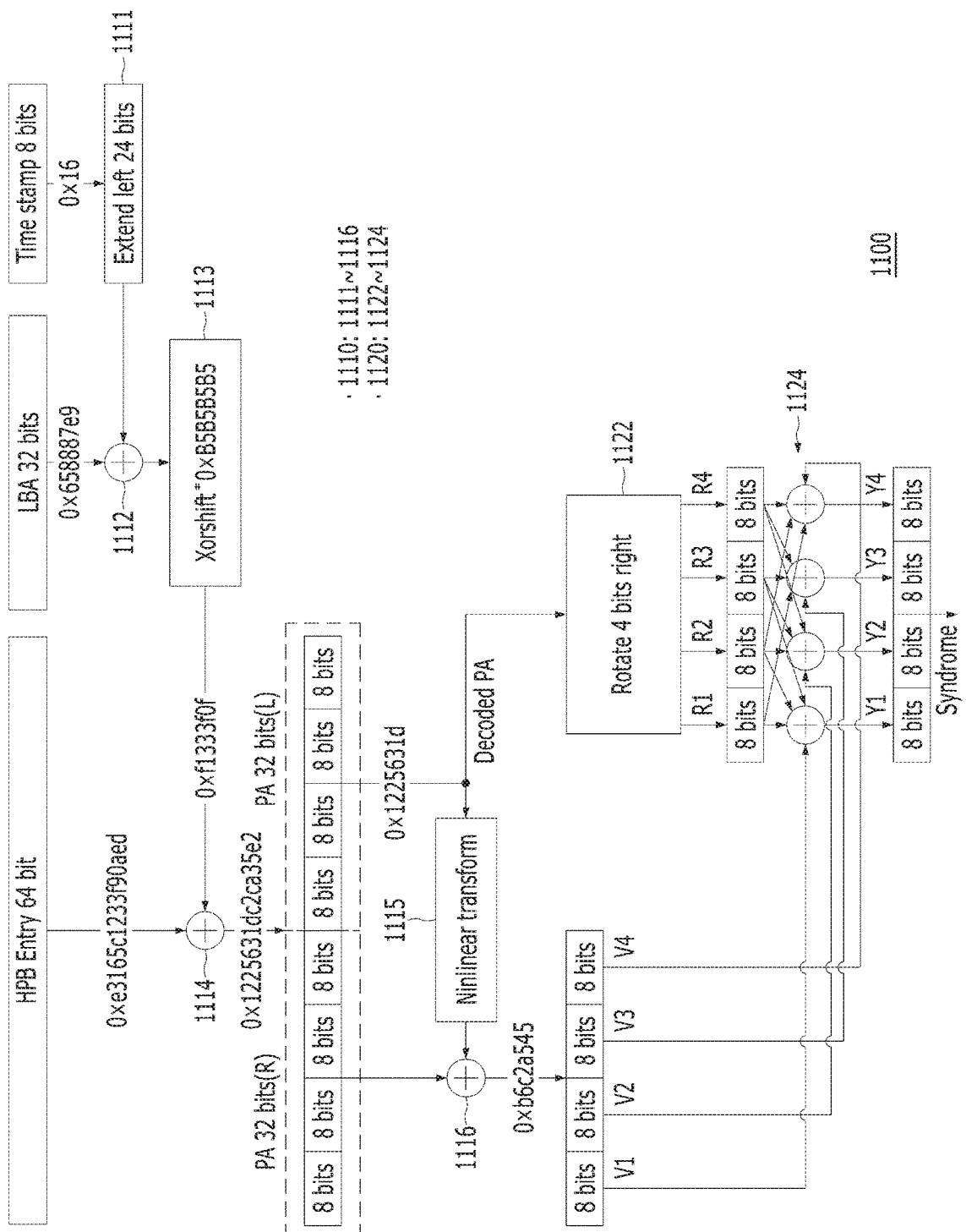
FIGS. 14A and 14B illustrate an example of a decoding device for HPB entry decoding, as shown in FIGS. 13A and 13B.
Figure 14B:
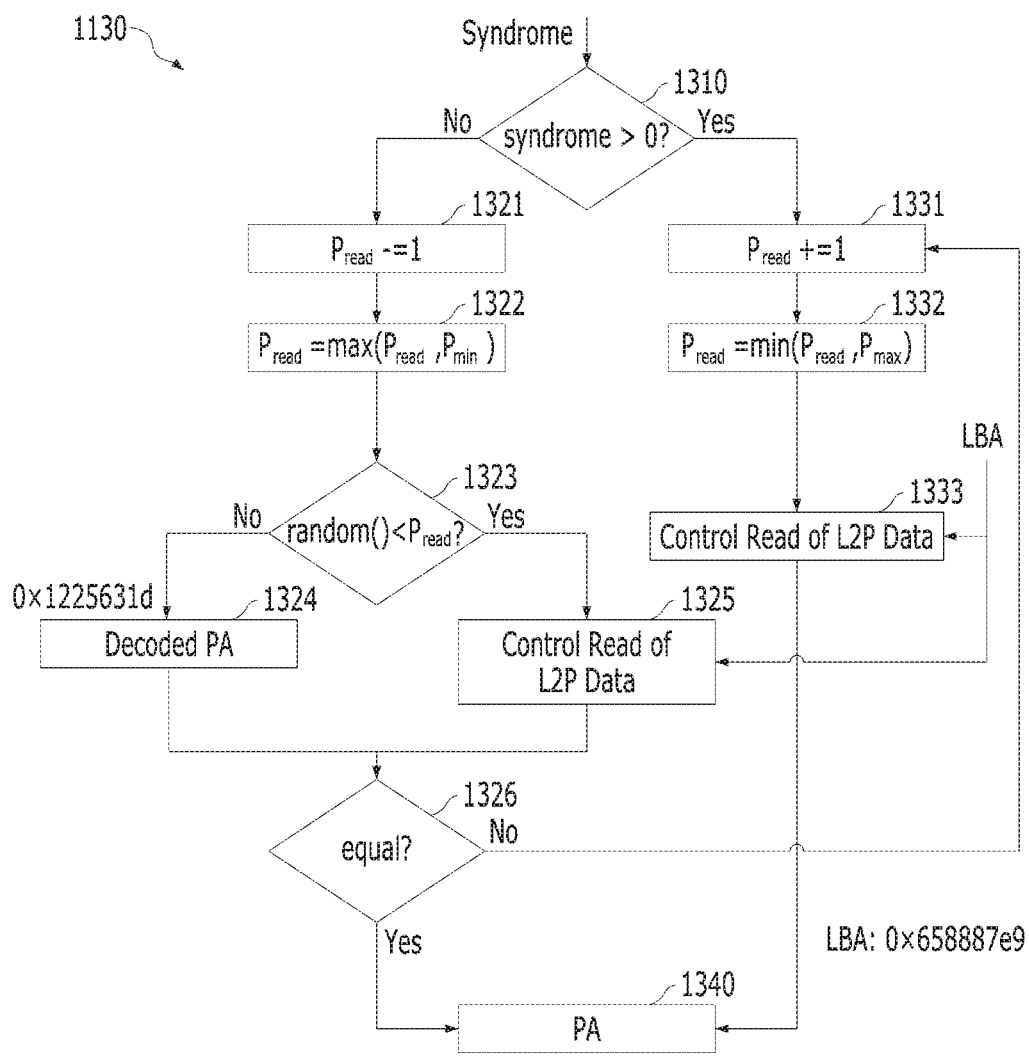

FIGS. 14A and 14B illustrate an example of the decoding device 1100 for HPB entry decoding, as shown in FIGS. 13A and 13B.

In FIGS. 14A and 14B, it is assumed that LBA=0x658887e9, Timestamp=0x16 and Codeword (i.e., HPB Entry)=0xe3165c1233f90aed. The output of the first nonlinear transform component 1113 is i.e., the xorshift and multiplication result of LBA and Timestamp is 0xf1333f0f. The value 0xf1333f0f is xored with the codeword 0xe3165c1233f90aed by the second XOR operator 1114 to output the codeword 0x1225631dc2ca35e2. The first part (i.e., right part) of the codeword 0x1225631dc2ca35e2 is determined as decoded PA 0x1225631d.

The decoded PA 0x1225631d is multiplied by the constant by the second nonlinear transform component 1115. The multiplication result is xored with the second part (i.e., left part) of the codeword 0x1225631dc2ca35e2 by the third XOR operator 1116. The third XOR operator 1116 computes the check value 0xb6c2a545 from the codeword. Another check value is computed by the rotator 1122 of the linear decoder 1120. The comparison between two check values is made by the group of XOR operator 1124.

If check values are equal (i.e., syndrome value is zero in 1310), the probability ($P_{read}$) of PA to be fetched from the NAND memory device is decreased, if it is greater than the minimal allowed value (1321). If check values are different (i.e., syndrome value is zero in 1310), the probability ($P_{read}$) of PA to be fetched from the NAND memory device is increased, if it is less than the maximal allowed value (1331). Then, the random number from the range [0; MAX_INT] is generated by the random number generator. If the random number is less than the probability ($P_{read}$) of PA to be fetched from the NAND memory device, the physical address (PA) corresponding to the received LBA is read from the NAND memory device (1325). The read PA is compared with the decoded PA (1326). If they are different and check values are equal, the probability ($P_{read}$) of PA to be fetched from the NAND memory device is increased, if it is less than maximal allowed value (1331). If the read from the NAND memory device was performed, its result is used as the resulting PA, otherwise the decoded value is used.

As described above, embodiments provide the encoding and decoding device for system data (e.g., L2P map data) of a storage device stored on a host. The error encoding and decoding scheme uses a family of error detection codes including linear and nonlinear codes and probabilistic adaptable performing of control read of L2P data. Accordingly, in accordance with embodiments, the encoding and decoding device has advantageous characteristics in terms of error protection, improved error detection, and customization.

Although the foregoing embodiments have been illustrated and described in some detail for purposes of clarity and understanding, the present invention is not limited to the details provided. There are many alternative ways of implementing the invention, as one skilled in the art will appreciate in light of the foregoing disclosure. The disclosed embodiments are thus illustrative, not restrictive. The present invention is intended to embrace all modifications and alternatives that fall within the scope of the claims.

What is claimed is:

1. An encoding device for a storage device, the encoding device comprising:
   a linear encoder suitable for encoding first data to generate encoded data; and
   a nonlinear transformer suitable for transforming the encoded data with second data to generate output data,
   wherein the first data includes data on a physical address corresponding to a logical address,
   wherein the second data, which includes the logical address and a timestamp value indicating a version of map data mapping between the logical address and the physical address, is input to the nonlinear transformer,
   wherein the nonlinear transformer generates a codeword to be sent to a host as the output data by encrypting the encoded data with the logical address and the timestamp value, and
   wherein the linear encoder is configured to bitwise rotate each segment of the first data and to perform an XOR operation of each of the rotated segments with another rotated segment.

2. The encoding device of claim 1, wherein the first data includes multiple segments, with the segment including multiple bits, and
   wherein the linear encoder includes:
   a rotator suitable for bitwise rotating each segment of the first data to a set direction to generate rotated segments; and
   a group of exclusive OR (XOR) operators, each XOR operator suitable for performing an XOR operation on each rotated segment with other rotated segments to generate the encoded data.

3. The encoding device of claim 2, wherein the rotator rotates each segment to a set direction by a set number of bits.

4. The encoding device of claim 3, wherein the first data includes four segments, and
   wherein each XOR operator performs the XOR operation on each rotated segment and two rotated segments sequentially following the corresponding rotated segment among the select other rotated segments.

5. The encoding device of claim 1, wherein the nonlinear transformer includes:
   a first nonlinear transform component suitable for generating a first multiplication value corresponding to the first data multiplied by a set value;
   a first exclusive OR (XOR) operator suitable for performing an XOR operation on the encoded data and the first multiplication value to generate a first operation value;
   a second XOR operator suitable for performing an XOR operation on the logical address and a shifted timestamp value to generate a second operation value;
   a second nonlinear transform component suitable for generating a second multiplication value corresponding to the second operation value multiplied by a set value; and
   a third XOR operator suitable for performing an XOR operation on the first operation value, the first data and the second multiplication value to generate a third operation value as the output data.

6. The encoding device of claim 5, wherein the first data includes multiple segments, each segment including a plurality of bits, and each of the logical address and the timestamp value includes a plurality of bits,
   wherein the number of bits of the logical address is greater than the number of bits of the timestamp value, and
   wherein the second XOR operator performs the XOR operation on the logical address and the shifted timestamp value, which corresponds to the timestamp value shifted by the difference between the logical address and the timestamp value, to generate the second operation value.

7. The encoding device of claim 5, wherein the third XOR operator performs the XOR operation on a sequence including the first operation value and the first data, and the second multiplication value to generate the third operation value.

* * * * *